United States Patent [19]

Talerico et al.

[11] 4,391,003
[45] Jul. 5, 1983

[54] WATER-SAVING DEVICE FOR USE WITH TOILETS

[76] Inventors: Joseph M. Talerico, 103 W. Greenbrook Rd; Henry Fleischer, 15 Wind Ridge Dr., both of North Caldwell, N.J. 07006

[21] Appl. No.: 351,666

[22] Filed: Feb. 24, 1982

[51] Int. Cl.³ .................. E03D 1/00; E03D 1/14; E03D 3/12
[52] U.S. Cl. ............................ 4/415; 4/324; 4/325; 4/381; 4/405
[58] Field of Search .................. 4/324, 325, 326, 361, 4/378, 415, 412, 405, 381, 391, 394, 395

[56] References Cited

U.S. PATENT DOCUMENTS

| 1,960,864 | 5/1934 | Brown | 4/326 |
| 2,237,294 | 4/1941 | Easley | 4/361 |
| 2,532,977 | 12/1950 | White | 4/325 |
| 2,754,521 | 7/1956 | Marcum | 4/326 |
| 3,108,286 | 10/1963 | Moore | 4/325 |
| 3,153,247 | 10/1964 | Walsh | 4/325 |
| 3,156,930 | 11/1964 | Moulton et al. | 4/325 |
| 3,380,077 | 4/1968 | Armstrong | 4/325 |
| 3,538,519 | 11/1970 | Weisz | 4/325 |
| 3,775,778 | 12/1978 | Lee | 4/325 |
| 3,839,746 | 10/1974 | Kowalski | 4/325 |
| 3,885,253 | 5/1975 | Overbey | 4/325 |
| 4,080,669 | 3/1978 | Biggerstaff | 4/325 |
| 4,086,667 | 5/1978 | Miklos | 4/325 |
| 4,135,262 | 1/1979 | Overbey | 4/325 |
| 4,225,987 | 10/1980 | Goldman et al. | 4/325 |
| 4,232,408 | 11/1980 | Chen-Yuan | 4/325 |
| 4,351,071 | 9/1982 | Clar | 4/324 |

Primary Examiner—Henry K. Artis

[57] ABSTRACT

A water-saving device for toilets is provided which when employed in a conventional toilet tank allows for flushing a conventional toilet employing an amount of water which is substantially less than usually employed. The water-saving device of the invention employs a combination of a lower float and an upper float; upon flushing, the lower float functions as a closure member for the orifice in the bottom of the toilet tank and the upper float is adapted to bear against the lower float to force the lower float to seat in the orifice of the tank after the level of water in the tank has been reduced to 75% or less of the water normally used in flushing a toilet. In addition, locking means and related control means are provided for releasing the upper float when the toilet is flushed and for locking the upper float in an immobile position when the flush has been effected.

16 Claims, 11 Drawing Figures

WATER-SAVING DEVICE FOR USE WITH TOILETS

FIELD OF THE INVENTION

The present invention relates to a water-saving device adapted for use in a conventional toilet tank to substantially reduce the amount of water normally employed in flushing a toilet.

BACKGROUND OF THE INVENTION

Potable water is at a premium today throughout the United States due to shortage of rainfall in recent years. Reservoirs in various parts of the country are well below capacity with little relief in sight. The long range water outlook is rather bleak. All levels of public and private enterprise have urged reduction in water use, where possible, with particular attention being paid to those areas where use of potable water is not essential and might be easily replaced by use of non-drinking water.

One area where unbelievably large amounts of potable water are unnecessarily employed is in the flushing of convention toilets where some 4 to 7 gallons of potable water are consumed with each flush of the toilet. The action of flushing a conventional toilet actuates means for disengaging and unseating a float-closure means from an opening in the bottom of the toilet tank. Water in the tank then drains through the opening to flush the toilet. The flush is not completed until practically the entire volume of water filling the tank (that is, 3.5 to 6.5 gallons) is drained and consumed. When the level of water in the tank is reduced to substantially the bottom of the tank, the float-closure means is made to close or seat over the opening in the tank and water is made to run into the tank to fill same for the next flush.

In most countries outside the United States, non-potable water is employed for such purpose. However, in the United States, with its normal abundance of potable water, it has until now been unthinkable to use anything but potable water for flushing a toilet. With public resistance to using non-drinkable water for toilet flushing being substantial, thoughts have turned to other techniques for saving water by reducing the amount of water normally employed in a flush. Thus, one solution has been to place one or more bricks in the tank to reduce the water-holding capacity of the tank and thereby reduce the amount of water used in the flush. Unfortunately, this method has been found to be unsatisfactory in that constant flow of water in contact with the bricks erodes the bricks with the result that particles of aggregate and brick soil the tank and tend to clog the orifice in the bottom of the tank.

Other apparatus and techniques for reducing the amount of water normally consumed in a flush are disclosed in U.S. Pat. Nos. 1,960,864 to Brown, 2,237,294 to Easley, 2,754,521 to Marcum, 3,153,247 to Walsh, 3,380,077 to Armstrong, 3,839,746 to Kowalski, 4,080,669 to Biggerstaff, 4,086,667 to Miklos, 4,225,987 to Goldman et al., and 4,232,408 to Lee Chen-Yuan.

BRIEF DESCRIPTION OF THE INVENTION

In accordance with the present invention, a water-saving device for use in conjunction with a conventional toilet bowl-tank assembly is provided which, if desired, allows for substantial savings of water upon flushing. The water-saving device of the invention is adapted to be disposed in a conventional toilet tank, which tank includes a water outlet opening in the bottom thereof and means for replenishing water in the tank, the water-saving device including lower float means adapted to removably seat over the outlet opening in the toilet tank and prevent water from flowing out of the tank when so-seated;

upper float means actuated upon flushing and adapted to float with the level of water in the tank and contact and bear against the lower float means as the water level drops to a predetermined level in the tank and force the lower float means downwardly to seat over the outlet opening in the tank;

locking means adapted to lock the upper float means in an immobile position out of contact with the lower float means when the toilet tank is filled with water; and float control means in communication with the locking means and connected to the lower float means which, upon flushing the toilet, is adapted to lift the lower float means unseating it from the outlet opening in the tank to allow water to drain through while actuating the locking means to unlock the upper float means to thereby allow the upper float means to fall with the falling water level in the tank.

Thus, when the water level has fallen to a determined level, the upper float means contacts and weighs against the lower float means forcing it downwardly to finally seat over the outlet opening in the tank. The water level in the tank is thereby prevented from dropping to a level lower than the combined height of the lower float means and the upper float means. After the outlet opening in the tank is closed off by the lower float means upon completion of the flush, the water level rises in the tank causing the upper float means to float upwardly with the rising water level until the upper float means contacts the locking means and is locked into its immobile position. During this time, the lower float means through water pressure bearing against it and suction remains seated over the outlet opening in the tank.

The lower float means may take the form of a freely floating body or may be pivotally anchored to the bottom of the toilet tank so that through the action of the float control means (which may take the form of a chain connected to the lower float means) it may be pulled or pivoted upwardly to expose the outlet opening in the bottom of the tank or may be the force of the upper float means and water pressure be made to pivot or move downwardly to seat over the outlet opening as described above.

The water-saving device of the invention will also include fastening means to fasten, clamp, temporarily fix or otherwise position and dispose same in the tank of a conventional toilet assembly.

The locking means mentioned above may comprise a pivoted cam one portion of which includes upper float engaging means, such as a hook or other engaging means, to engage and hold the upper float means in an immobile position when the toilet-tank assembly is in an inactive state.

The float control means is interconnected with the locking means, as will be seen hereinafter, so that actuation of the float control means also actuates the locking means causing the cam to pivot and disengage the upper float means to allow it to float with the falling or rising water level in the tank. In one embodiment, the float control means will comprise a sprocket-chain assembly which includes upper and lower spockets and a chain (or segmented wire) one end of which is connected to the lower float means and the other end of which is passed in the nip between the sprockets and is connected to a handle means used for flushing the toilet. The upper sprocket will include a pin which passes through an opening in the cam of the locking means and is adapted to contact and cause the cam to pivot and disengage from the upper float means. Thus, an upwardly pulling action on the chain will cause the lower float means to be pulled upwardly unseating itself from the outlet opening in the tank while the chain drives the upper sprocket causing the pin attached thereto to move in the opening of the locking means cam which causes the cam to rotate or pivot downwardly and disengage itself from the upper float means. The falling upper float means then acts on the lower float means to reduce the amount of water used in the flush. A full description of this action and the remainder of the invention will be set out hereinafter in connection with the detailed description of the accompanying Figures which illustrate preferred embodiments of the present invention.

It will be appreciated that by use of the water-saving device of the invention, only 75%, 50% or even less than 50% of the water normally used in flushing a toilet is consumed depending upon the combined height of the upper and lower float means in the tank. In addition, action of the water-saving device of the invention may be by-passed, where desired, so that the normal amount of water is used in the flush. This is accomplished by pulling downwardly on the chain which causes the lower float means to unseat from the outlet opening without actuating the locking means so that the upper float means remains in a locked immobile position during the flushing action. The result is that only the falling water level causes the lower float means to seat over the outlet opening in the tank when substantially an entire tank volume of water has been consumed.

DETAILED DESCRIPTION OF THE FIGURES

Referring now to the accompanying Figures wherein like parts are represented by like numerals in the several views, FIGS. 1 to 7 illustrate a preferred embodiment of the water-saving device of the invention indicated generally by the numeral 10. The water-saving device 10 includes a support structure 12 which may be formed of plastic, metal or wood and is comprised of elongated horizontally disposed support member 14, vertically disposed support member 16, descending from horizontal support member 14, and horizontal shaft member 18 extending perpendicularly from horizontal support member 14. Support structure 12 also includes means 19 for fastening the water-saving device 10 to the inside of a toilet tank which will be described hereinafter.

Upper float means 20 which as shown is a generally conical shaped member truncated at its lower end includes a vertically disposed central bore 22 which extends from the top surface 24 to the bottom surface 26 of said upper float means 20, and includes an overhanging ledge or lip 30 at its upper end the purpose of which will become apparent hereinafter. The upper float means 20 may be formed of any rigid material that will be sufficiently buoyant to float in water and sufficiently rigid so that it may bear against lower float means to force same downward as described in more detail hereinafter. Basically, any rigid buoyant material may be employed such as rigid polyvinyl chloride, polyethylene, polymethyl methacrylate and the like, metal or even wood.

Extending downwardly from horizontal shaft member 18 is tubular member 28 including a central opening 29; tubular member 28 passes through the bore 22 of the upper float means 20 and thus defines an upward and downward path of movement for the upper float means 20.

Disposed below upper float means 20 is lower float means 32 which is adapted to seat over the outlet opening of a toilet tank to close off flow of water from the tank. Shaft 34 is connected to an upper portion of lower float means 32 and is adapted to extend into central opening 29 of tubular member 28 which thus defines a path of upward and downward movement for the lower float means 32.

Float control means as shown is formed of a sprocket and chain assembly generally indicated by the numeral 40 and include a pair of sprockets, upper sprocket 42 and lower sprocket 44, each of which are rotatably mounted on vertical support member 16, as shown. Each of the sprockets 42 and 44 includes openings, teeth, tracks or other chain engaging means 46 about its periphery for engaging chain 48 which is retained in the nip 51 between the sprockets 42,44. A lower end of chain 48 is connected to the lower float means 32 (or to its shaft 34), while the other (or upper) end is connected to control rod 49 of handle means 50, used in flushing the toilet.

Extending from upper sprocket 42 is cam linking means or pin means 52 the purpose of which will be apparent from the following description.

Locking means for holding the upper float means in an immobile position is indicated generally by the numeral 60 is formed of an elongated cam member 62 which is rotatably or pivotally mounted on horizontal support member 18 which extends out perpendicularly from support member 14. The cam member 62 includes near end 64 thereof, engaging means such as hooked member 66 for engaging the lip or overhanging ledge 30 of upper float means 20 to immobilize the upper float means 20 when the toilet is not in use.

Figure 1:
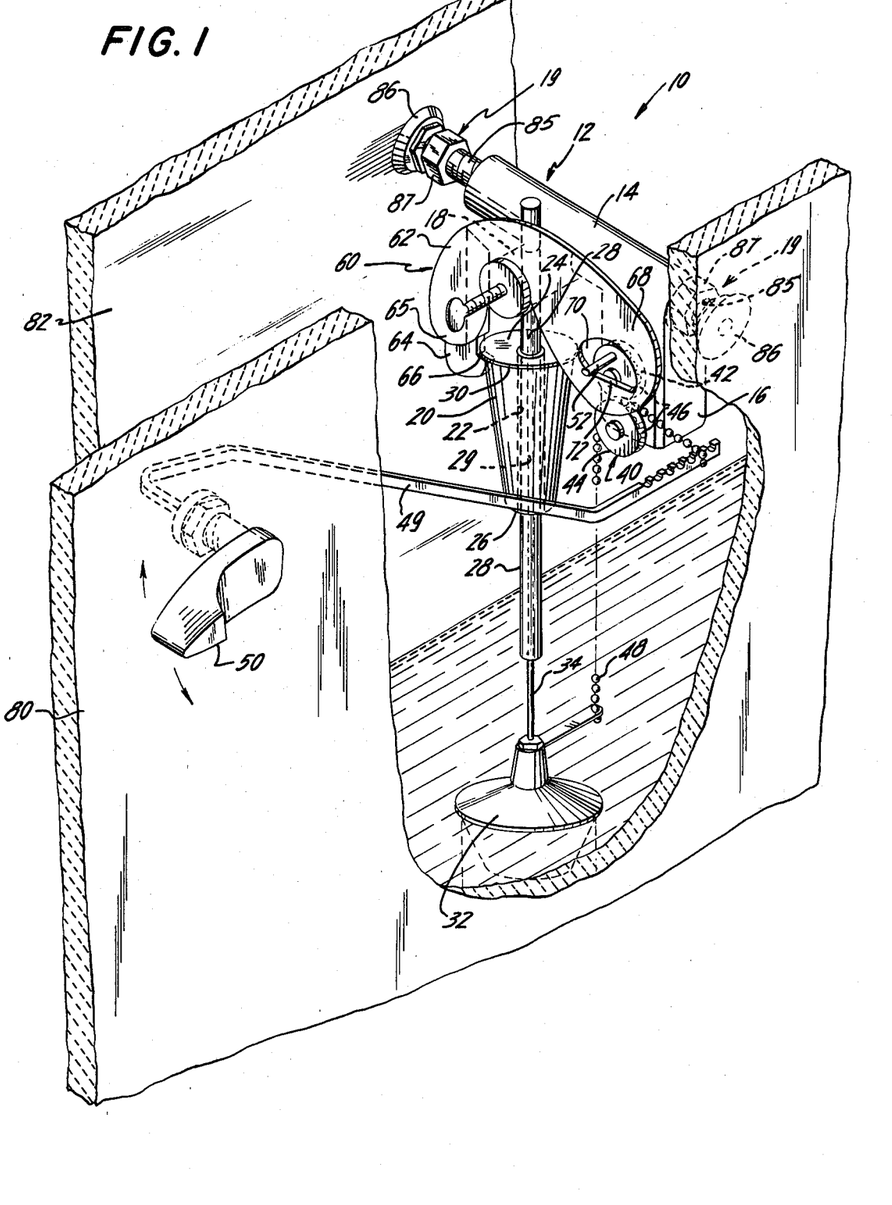
FIG. 1 is a perspective view of a preferred embodiment of the water-saving device of the invention installed in a toilet tank (partially cut-away) which tank is filled with water and is in an inactive or non-flush mode.
Figure 2:
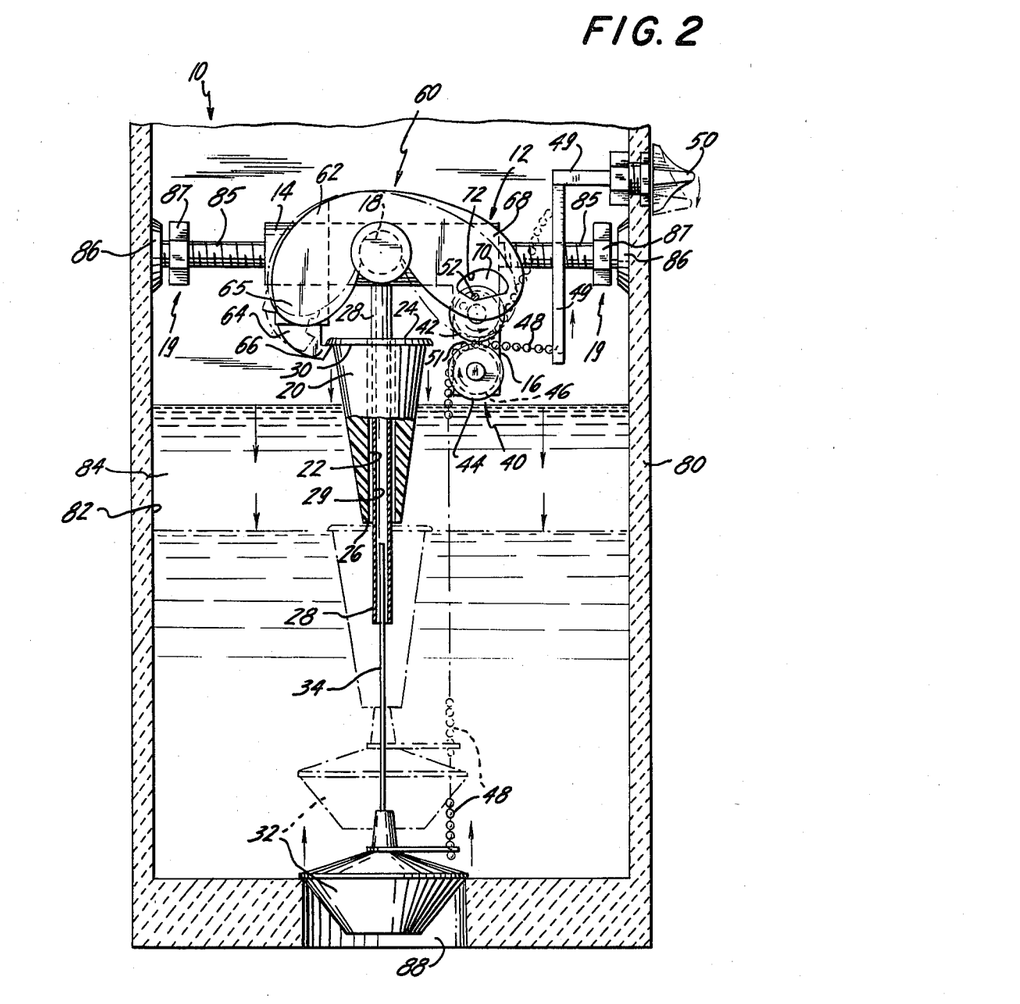
FIG. 2 is a front view of the water-saving device shown in FIG. 1, at the start of a partial or half flush, with the front of the tank removed.

The end 64 of cam member 62 is slightly heavier (and so-weighted) as at area 65 to ensure that the engaging means 66 is in a downward position as shown in FIGS. 1 and 2 and thus is ready to receive and engage the lip 30 of the upper float means 20 as it rises with the rising water level in the tank.

Cam member 62, also includes end 68, disposed oppositely end 64, which includes cam opening 70 which is adapted to receive pin means 52 of upper sprocket 42. The pin means 52 contacts inner cam walls 72 of cam opening 70 so that when the upper sprocket 42 is rotated, pin means 52 moves along inner cam walls 72 driving the end 68 downwardly and in turn causing end 64 and its engaging means 68 to be driven upwardly to disengage itself from the lip 30 of the upper float means 20.

As shown in FIGS. 1 to 7, the water-saving device 10 is installed in a toilet tank 80. The toilet tank 80 includes walls 82 which define an interior area 84. The water-saving device 10 may be mounted or fastened to the interior walls 82 of toilet tank 80 by means of expandable joint system 19 comprising adjustable screws 85 disposed at either end of the support member 14 and each terminating in stopper means 86. The device 10 is inserted in the tank 80 and fastened against the walls 82 thereof by simply adjusting screws 85 using adjusting nut 87 until stopper means 86 are flush against the walls 82.

The water-saving device 10 shown in FIGS. 1 to 7 and described above operates as follows.

Figure 3:
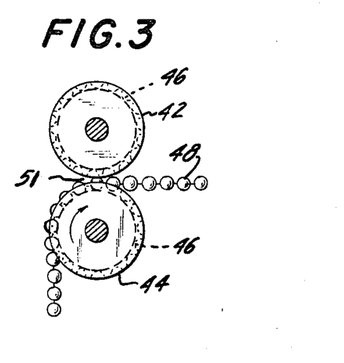
FIG. 3 is an enlarged front view of the float control means in the form of a sprocket-chain assembly, in its neutral position, employed in the water-saving device shown in FIGS. 1 and 2 and 8 and 9.

The water-saving device 10 is inserted in the upper portion of the tank 80 of a toilet tank combination by adjusting screws 85 until stopper means 86 contact and are pressed against the walls 82 of tank 80. The toilet tank 80 at this point is filled with water, as shown in FIGS. 1 and 2; the lower float means 32 is disposed over and seated in outlet opening 88 positioned in the bottom portion of tank 80, to close off opening 88, and the upper float means 20 is in an immobile position being retained and held in place by the engaging means 66 of cam member 62 and the sprocket-chain assembly is as shown in FIG. 3.

Figure 5:
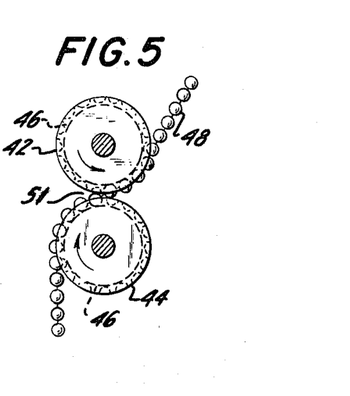
FIG. 5 is an enlarged front view of the sprocket-chain assembly, shown in FIG. 3, in its partial or half flush position.
Figure 6:
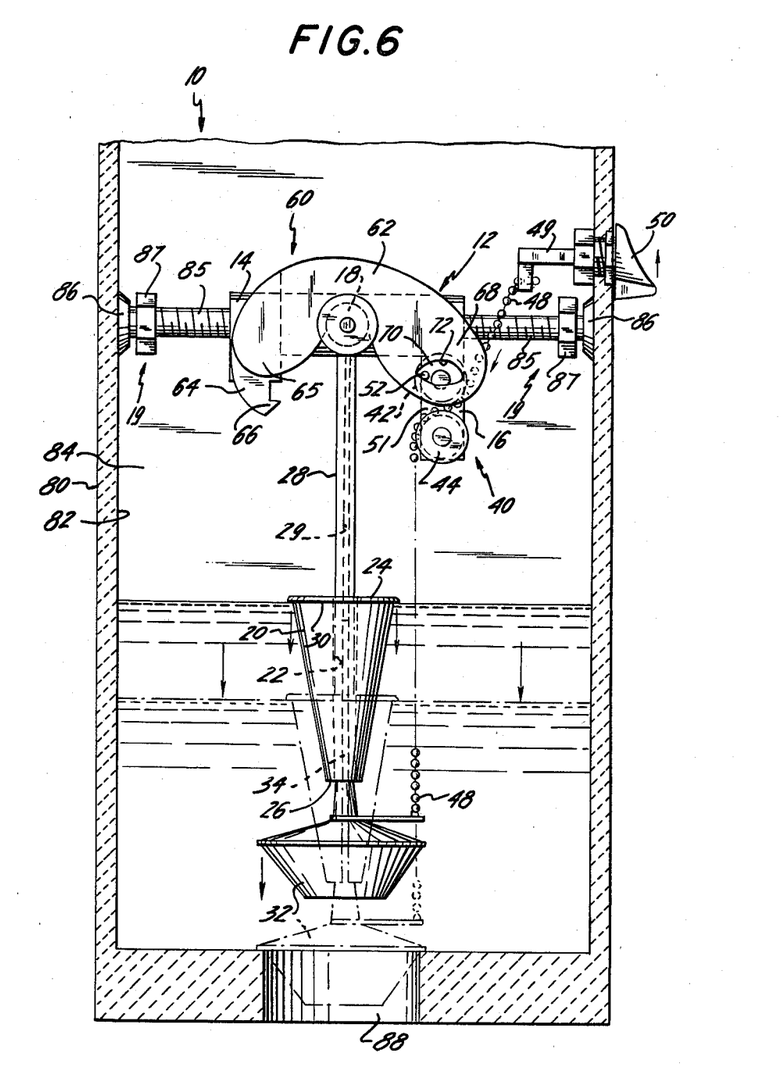
FIG. 6 is a front view of the water-saving device as shown in FIGS. 1 and 2 in its partial or half flush mode of operation.

As seen best in FIGS. 2, 5 and 6, when the toilet is flushed by pressing down on handle 50, control rod 49 causes the chain 48 to be pulled upwardly thereby causing the lower float means 32 to be lifted and thereby become unseated from the outlet opening 88 in tank 80 to allow water from the tank 80 to flush the toilet bowl. At the same time, the chain 48 drives upper sprocket 42 causing cam linking means or pin means 52 to move along and bear against the walls of cam opening 70 and cause cam member 62 to pivot or rotate slightly so that the weighted end 64 carrying the engaging means (hooked member) 66 is caused to move upwardly to disengage the hooked member from the lip 30 of the upper float member 20 thereby allowing it to float on the water in the tank 80. As the water level drops with the flushing action, the upper float means 20 drops along the tubular member 28 with the reducing water level until it contacts the lower float means 20 which is floating upwardly as shaft 34 moves upwardly through the central opening 29 of tubular member 28. With the weight of the upper float means 20 bearing down on the lower float means 32 as the water level sinks, the both of the upper and lower float means fall with the receding water level until the lower float means 32 is pushed over the seats in the outlet opening 88 to terminate flow of water out of the tank 80 and complete the flushing action. The water pressure and suction force causes the lower float means 32 to remain seated in opening 88 as water is allowed to flow back into the tank 80 by means of a water-replenishing system (not shown here for drawing clarity) such as that shown in U.S. Pat. Nos. 4,225,987 and 3,380,077 or other conventional system none of which forms any part of the present invention.

Figure 4:
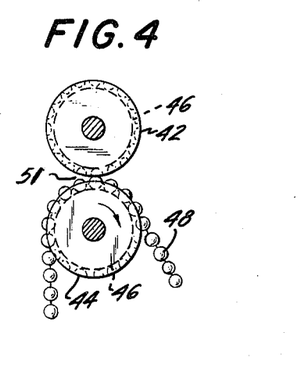
FIG. 4 is an enlarged front view of the sprocket-chain assembly shown in FIG. 3, in its full flush position.
Figure 7:
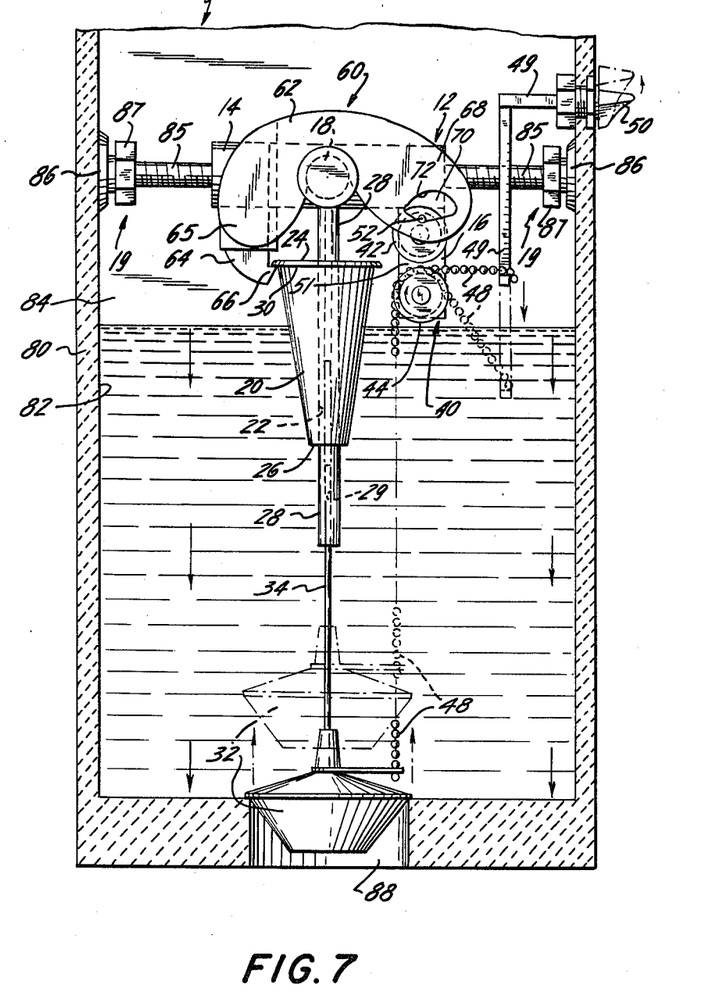
FIG. 7 is a front view of the water-saving device as shown in FIGS. 1 and 2 in its full flush mode of operation.

The upper float means 20 rises upwardly with the rising water level in the tank until the lip 30 of upper float means 20 catches the hooked member 66 of cam member 62 and is thereby engaged and held immobile as shown in FIGS. 1 and 2. Thus, it is seen that if the combined height of the upper and lower float means were equal to about one-half the height of the interior of tank 80, the flush would be completed when the water level in the tank dropped to about one-half its full level, so that only one-half of the water capacity or volume in the tank would be consumed in the flush. Thus a water savings of one-half the volume of the tank would be effected.

Where it is desired to operate the toilet so that all of the water in the tank 80 is consumed in the flush, as seen in FIGS. 4 and 7, one need only pull upwardly on the handle 50 which acts on control rod 49 to cause chain 48 to be pulled downwardly and substantially out from contact with upper sprocket 42. As the chain 48 is pulled downwardly, it lifts and unseats the lower float means 32 from the outlet opening 88 in tank 80 allowing water to drain out for flushing. The lower float means 32 floats with the receding water level in the tank and when the water in the tank has practically emptied, the lower float means 32 seats over the outlet opening 88 to close off same and the water-replenishing system allows water to enter and fill the tank 80.

Referring now to FIGS. 8 to 11, an alternate embodiment of the water-saving device of the invention is illustrated and is identified generally by the numeral 100. The water-saving device 100 is similar to that shown in FIGS. 1 to 7 except that the lower float means 32 and accompanying shaft 34 is replaced by a floatable closure member or flap 102 (usually made of a rubber-like material) which is pivotably connected to the floor of toilet tank 80 so that in its closed (unpivoted) position it closes off outlet opening 88 in tank 80. Chain 48 (part of the sprocket-chain assembly 40 discussed above in connection with FIGS. 1 to 7) is connected to the floatable closure member 102 so that movement up or down of handle 50 causes the chain 48 to life the floatable closure member 102 to unseat same and uncover outlet opening 88.

Figure 8:
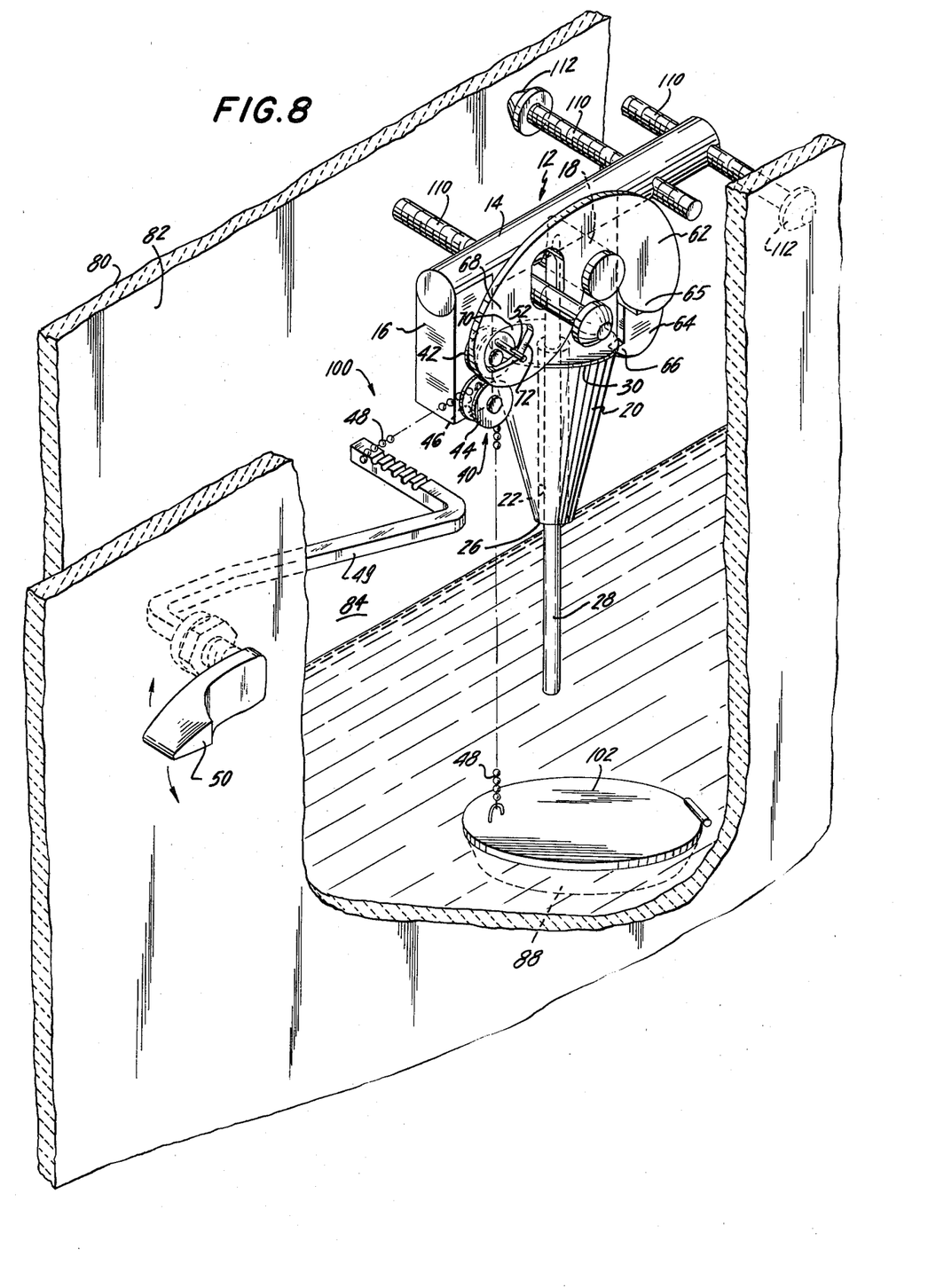
FIG. 8 is a perspective view of another preferred embodiment of the water-saving device of the invention installed in a toilet tank (partially cut away) which tank is filled with water and is in an inactive or non-flush mode.

Alternate means are shown in FIG. 8 for mounting or fastening the water-saving device of the invention to the inside of a tank 80. As seen, such means comprise a series of adjustable screws 110 (similar to those shown in FIGS. 1 and 2) which pass perpendicularly through the support member 14 and terminate in stopper members 112 which are adapted to be pressed firmly against the walls of the tank by suitably adjusting nuts (not shown for drawing clarity).

Either of the aforedescribed mounting means or other conventional mounting means may be employed to mount any of the embodiments of the water-saving device of the invention in a suitable water tank.

Figure 9:
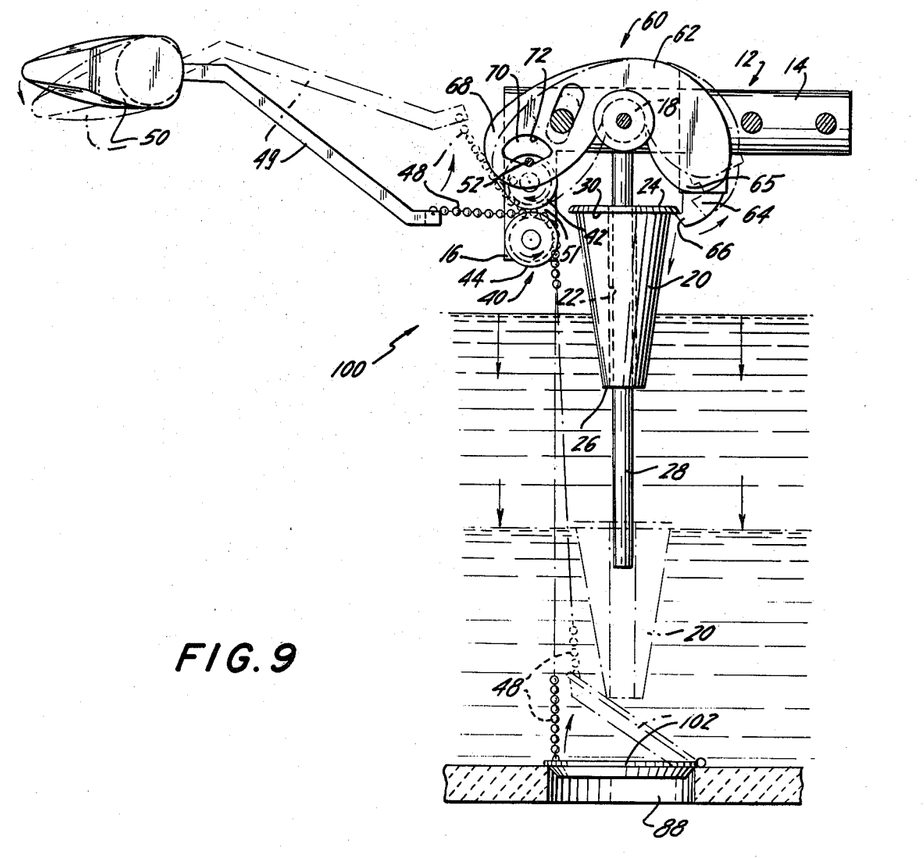
FIG. 9 is a front view of the water-saving device shown in FIG. 8, at the start of a partial or half flush.
Figure 10:
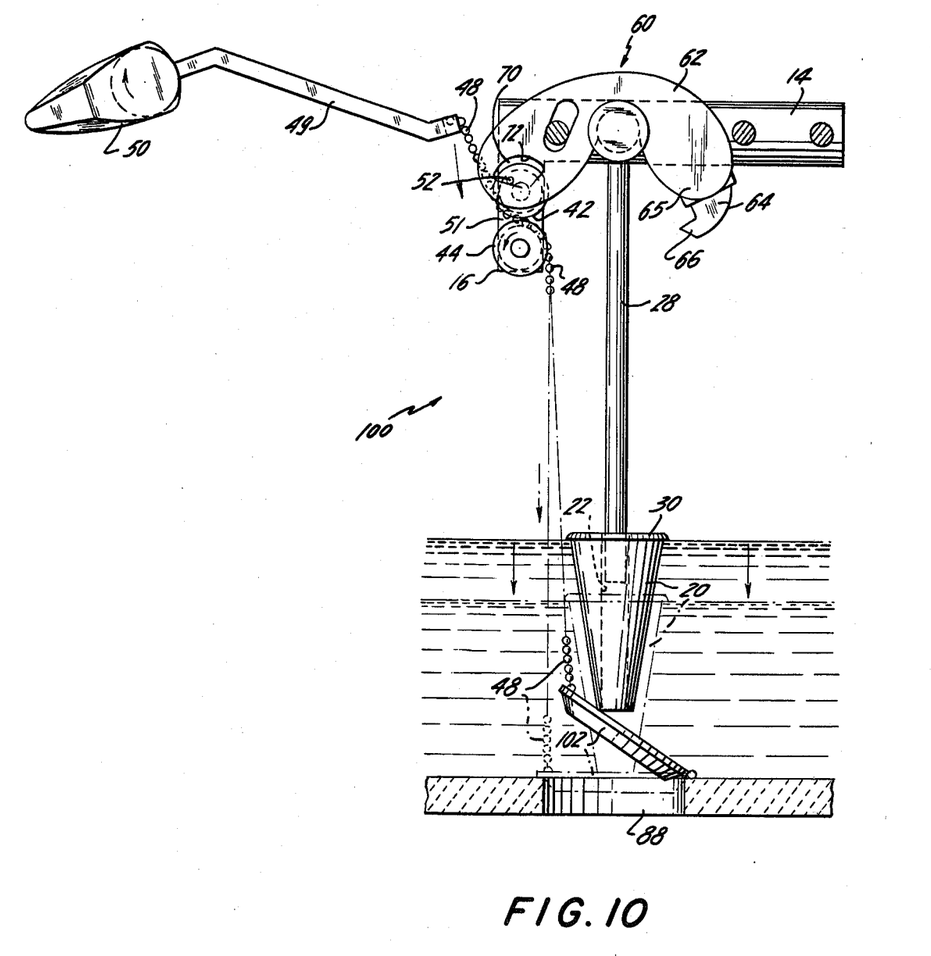
FIG. 10 is a front view of the water-saving device as shown in FIGS. 8 and 9 in its partial or half flush mode of operation.

The upper float means 20 functions as in FIGS. 1 to 7 to cause the floatable closure member 102 to close off outlet opening 88 when the level of water in the tank reaches 75%, 50% or less of the water level in a full tank. Thus, after the closure member 102 is lifted upwardly as shown in FIGS. 9 and 10, the chain 48 drives sprocket 42 causing cam member 62 to release the upper float means 20. As the water level drops, the upper float means 20 contacts the closure member 102 and presses downwardly seating it in outlet opening 88 to terminate the flush. As water enters and rises in the tank 80, the upper float means 20 floats upwardly until it is engaged by the cam opening means 66.

It will be appreciated that with the latter embodiment, it may be desirable to increase the length or height of the upper float means 20 since the lower float means which will take the form of floatable closure member or flap 102 will usually be of a height less than the lower float means 32 shown in FIGS. 1 to 7. Thus, in this embodiment, as before, it will be the combined height of the upper and lower float means which will determine how much water will be allowed to drain out of the tank before the upper float means 20 causes the closure member or flap 102 to be pivoted downwardly to close off outlet opening 88 and terminate the flush.

Figure 11:
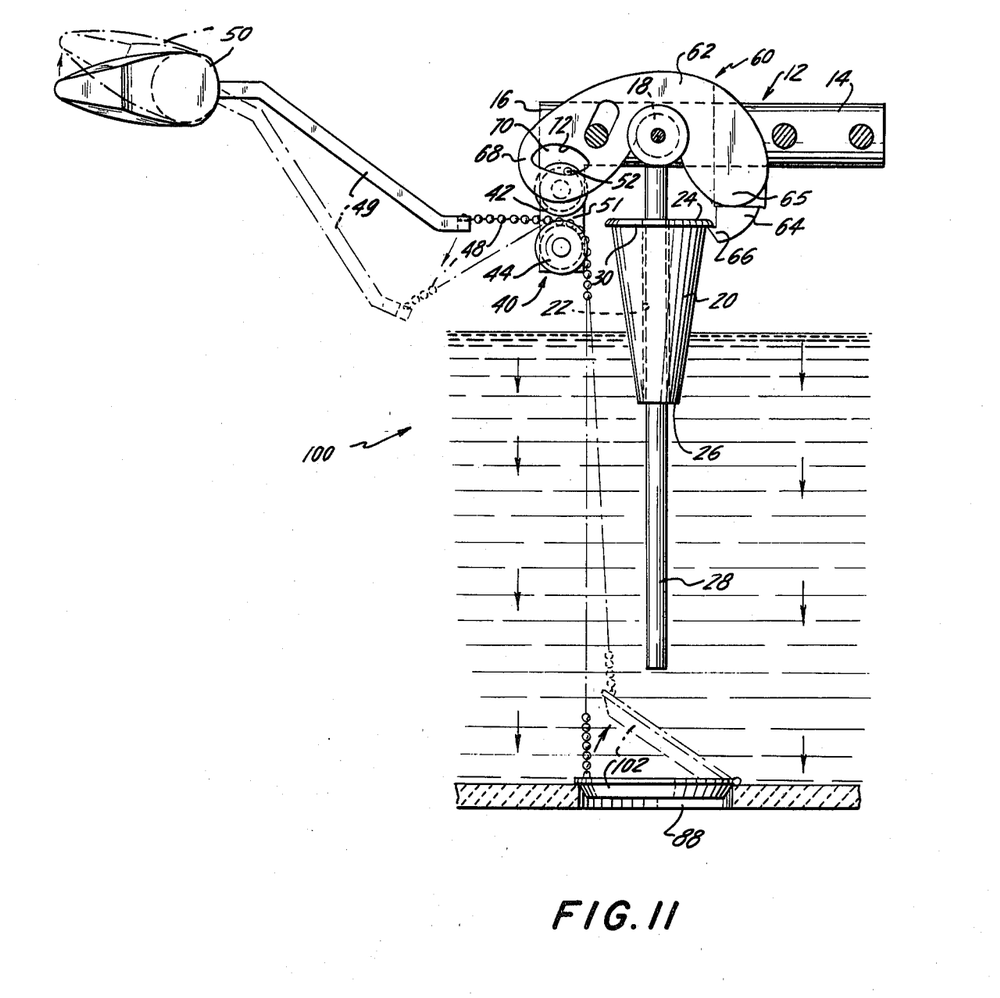
FIG. 11 is a front view of the water-saving device shown in FIGS. 8 and 9 in its full flush mode of operation.

As seen in FIG. 11, where it is desired to operate the toilet so that all of the water in the tank 80 is consumed in the flush, one need only pull upwardly on the handle 50 which acts on control rod 49 to cause chain 48 to be pulled downwardly and substantailly out from contact with upper sprocket 42. As the chain 48 is pulled downwardly, it pivots upwardly and unseats the closure flap 102 from the outlet opening 88 in tank 80 allowing water to drain out for flushing. The closure flap 102 floats with the receding water level in the tank and when the water in the tank has practically emptied, the flap 102 pivots downwardly and seats over the outlet opening 88 to close off same and the water-replenishing system allows water to enter and fill the tank 80.

It will be appreciated that where it is desired to employ the water-saving device of the invention for only partial flushing, the lower sprocket 44 shown in the aforedescribed Figures may be eliminated entirely.

What is claimed is:

1. A water-saving device for use in conjunction with a toilet bowl-tank assembly, which includes a tank having an outlet opening in the bottom thereof and means for replenishing water in the tank, comprising, in combination:

lower float means adapted to removably seat over the opening in the bottom of a toilet tank;

upper float means actuated upon flushing and adapted to float with the level of water in the toilet tank and contact the lower float means as the water level drops to a predetermined level in the toilet tank and thence force the lower float means to seat over the opening in the bottom of the toilet tank;

locking means adapted to lock the upper float means in an immobile position out of contact with the lower float means when the toilet tank is filled with water;

float control means in communication with the locking means and connected to the lower float means which, upon flushing the toilet, is adapted to unseat the lower float means from the outlet opening in the toilet tank to allow water to drain out, while causing the locking means to unlock the upper float means to thereby allow the upper float means to fall with the falling level of water in the toilet tank whereby when the water level has fallen to a predetermined level, the upper float means contacts and weighs against the lower float means forcing it downwardly and seat over the outlet opening in the toilet tank and thereby preventing the water level in the tank from dropping any further, and as the water level rises in the tank the upper float means floats upwardly with the rising water level until it contacts the locking means and is locked into its immobile position while the lower float means, through the force of water bearing against it and suction, remains seated over the outlet opening in the toilet tank.

2. The water-saving device as defined in claim 1 wherein said lower float means comprises a float closure adapted to rise and fall with the water level in a toilet tank.

3. The water-saving device as defined in claim 1 wherein said lower float means is adapted to be pivotally connected to the bottom of the toilet tank so that it may be pivoted away from the outlet opening to an open position.

4. The water-saving device as defined in claim 1 further including support means for supporting said upper and lower float means, said locking means, and said float control means.

5. The water-saving device as defined in claim 4 further including means for fixing said support means in the tank of a toilet-tank assembly.

6. The water-saving device as defined in claim 4 wherein said upper float means includes a central bore and said support means includes a rigid tube extending through said central bore of said upper float means and defining a path of movement for said upper float means as it rises and falls with the level of water in a toilet tank.

7. The water-saving device as defined in claim 6 further including a shaft one end of which is connected to said lower float means, the other end of said shaft extending into said rigid tube which passes through said upper float means so that said rigid tube also defines a path of movement for said lower float means directly below said upper float means as said lower float means is pulled upwardly by said float control means away from said outlet opening of said toilet tank.

8. The water-saving device as defined in claim 4 wherein said upper float means includes means for engaging said locking means to lock said upper float means in an immobile position.

9. The water-saving device as defined in claim 8 wherein said engaging means of said upper float means comprises an overhanging lip disposed about said upper float means and said locking means includes a hooked member adapted to engage said lip.

10. The water-saving device as defined in claim 1 wherein said upper float means is of a substantially conical shape having a central bore running therethrough and an overhanging lip extending from an upper portion thereof.

11. The water-saving device as defined in claim 4 wherein said locking means comprises a cam member pivotally connected to said support means, one portion of which includes engaging means for engaging said upper float means, and further includes means for linking said cam member to said float control means.

12. The water-saving device as defined in claim 11 wherein said float control means comprises upper and lower rotatable sprockets employed in close proximity to one another and rotatably connected to said support means, said upper sprocket including cam linking means for linking said sprocket to said cam member, and a chain or wire extending through the nip between said upper and lower sprockets, one end of said chain being connected to said lower float means, and the other end of which is connected to handle means for flushing a toilet, whereby pulling up on said chain causes said upper sprocket to actuate said cam member to pivot about said support means and cause said engaging means of said cam member to disengage from said upper float means.

13. The water-saving device as defined in claim 12 wherein said cam linking means of said upper sprocket includes pin means, and said means for linking said cam member to said float control means comprises a track or opening in said cam member, said pin means being positioned in said opening in said cam member so that when said chain causes said upper sprocket to rotate, said pin means bears against the walls of said opening in said cam member thereby causing said cam member to pivot about said support member.

14. The water-saving device as defined in claim 11 wherein said engaging means of said cam member comprises a hooked member.

15. The water-saving device as defined in claim 14 wherein the portion of same cam member including said hooked member is weighted so that said hooked member will be in position to engage said upper float means with the rising water level.

16. A toilet bowl-tank assembly adapted to use 75% or less of the volume of water in the tank for flushing, comprising a toilet bowl, a toilet tank in combination therewith which tank includes an outlet opening in the bottom thereof, water replenishing means, and float means and related control means adapted to open and close off the outlet opening in the tank upon flushing the toilet, the improvement of which comprises float means and related control means in the form of the water-saving device as defined in claim 1 disposed in said toilet tank.

* * * * *